(12) United States Patent
Denninnart et al.

(10) Patent No.: US 11,522,810 B2
(45) Date of Patent: Dec. 6, 2022

(54) SYSTEM FOR REQUEST AGGREGATION IN CLOUD COMPUTING SERVICES

(71) Applicant: University of Louisiana at Lafayette, Lafayette, LA (US)

(72) Inventors: Chavit Denninnart, Lafayette, LA (US); Mohsen Amini Salehi, Lafayette, LA (US)

(73) Assignee: UNIVERSITY OF LOUISIANA AT LAFAYETTE, Lafayette, LA (US)

(*) Notice: Subject to any disclaimer, the term of this patent is extended or adjusted under 35 U.S.C. 154(b) by 0 days.

(21) Appl. No.: 16/663,535

(22) Filed: Oct. 25, 2019

(65) Prior Publication Data

US 2020/0136992 A1    Apr. 30, 2020

Related U.S. Application Data

(60) Provisional application No. 62/750,602, filed on Oct. 25, 2018.

(51) Int. Cl.
| | |
|---|---|
| *H04W 4/00* | (2018.01) |
| *H04L 47/80* | (2022.01) |
| *H04L 47/78* | (2022.01) |
| *H04L 47/70* | (2022.01) |

(52) U.S. Cl.
CPC .......... *H04L 47/805* (2013.01); *H04L 47/781* (2013.01); *H04L 47/808* (2013.01); *H04L 47/821* (2013.01); *H04L 47/826* (2013.01); *H04L 47/827* (2013.01)

(58) Field of Classification Search
CPC ... H04L 47/805; H04L 47/781; H04L 47/808; H04L 47/821; H04L 47/826; H04L 47/827
See application file for complete search history.

(56) References Cited

U.S. PATENT DOCUMENTS

| | | | |
|---|---|---|---|
| 6,230,200 B1* | 5/2001 | Forecast | G06F 9/50 709/219 |
| 8,955,027 B1* | 2/2015 | Dong | H04N 21/435 725/116 |
| 9,860,612 B2* | 1/2018 | Good | H04N 21/8456 |
| 10,346,737 B1* | 7/2019 | Benitez | G11B 27/102 |
| 2005/0179567 A1* | 8/2005 | Apostolopoulos | H04N 21/235 341/50 |
| 2009/0193475 A1* | 7/2009 | Halverson | H04N 21/858 725/87 |
| 2010/0235542 A1* | 9/2010 | Visharam | H04N 21/23805 709/246 |

(Continued)

*Primary Examiner* — Abdelnabi O Musa
(74) *Attorney, Agent, or Firm* — Kean Miller, LLP; Russel O. Primeaux; Jessica C. Engler (57) ABSTRACT

Cloud-based computing systems, although claimed to have virtually unlimited resources, could get oversubscribed due to budget constraints of cloud users. The disclosed invention proposes a mechanism to identify various types of "mergeable" tasks. The system also determines when it is appropriate to aggregate tasks and how to allocate them so that the QoS of other tasks is not affected. Experimental results under real-world workload settings show that the disclosed system can improve robustness of the system in the face of oversubscription and also saves the overall time of using cloud services by more than 14%.

9 Claims, 9 Drawing Sheets

(56) References Cited

U.S. PATENT DOCUMENTS

| | | | |
|---|---|---|---|
| 2012/0254456 A1* | 10/2012 | Visharam | H04N 21/2343 709/231 |
| 2015/0295970 A1* | 10/2015 | Wang | G06F 9/5027 709/231 |
| 2018/0004818 A1* | 1/2018 | Sarma | G06F 16/24568 |
| 2021/0104014 A1* | 4/2021 | Kolb | G06T 5/003 |

* cited by examiner

(a) DMR under FCFS Queue

FIGURE 3b (b) DMR under EDF Queue

FIGURE 3c (c) DMR under MU Queue

(a) Execution time with FCFS queue

FIGURE 6b

(b) Execution time with EDF queue

FIGURE 6c

(c) Execution time with Max Urgency queue

FIGURE 7a

(a) DMR under FCFS Queue system

FIGURE 7b (b) DMR under EDF system

FIGURE 7c (c) DMR under Max Urgency system

SYSTEM FOR REQUEST AGGREGATION IN CLOUD COMPUTING SERVICES

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A "SEQUENCE LISTING", A TABLE, OR COMPUTER PROGRAM

Not applicable.

DESCRIPTION OF THE DRAWINGS

The drawings constitute a part of this specification and include exemplary examples of the SYSTEM FOR REQUEST AGGREGATION IN CLOUD COMPUTING SERVICES, which may take the form of multiple embodiments. It is to be understood that, in some instances, various aspects of the invention may be shown exaggerated or enlarged to facilitate an understanding of the invention. Therefore, drawings may not be to scale.

FIGS. 3a through 3c show graph comparisons of the deadline miss-rate (DMR) under varying number of GOP tasks (horizontal axes) in two scenarios: without task merging, and with task merging.

FIGS. 6a through 6c provide graph comparisons of the total time of executing all tasks (called makespan in vertical axes) under varying number of GOP tasks (horizontal axes) in three scenarios: without task merging, with considerate task merging, and aggressive task merging.

FIGS. 7a through 7c provide graph comparisons of the deadline miss-rate (DMR) under varying number of GOP tasks (horizontal axes) in three scenarios: without task merging, with considerate task merging, and aggressive task merging.

BACKGROUND OF THE INVENTION

Video streams, either in form of on-demand streaming or live streaming, usually have to be converted (i.e., transcoded) based on the characteristics of clients' devices. Transcoding can encompass operations such as bit rate adjustment, spatial resolution reduction, temporal resolution (aka frame rate) reduction, and video compression standard (codec) conversion. Transcoding can be either performed offline or in an online (i.e., on-demand) manner for videos that are rarely accessed. However, in the case of live video streaming, it is compulsory to transcode videos in an on-demand manner because they are not available for offline processing.

A video stream is composed of several sequences. Each sequence itself is composed of multiple Group Of Pictures (GOPs) with sequence header at the beginning Each GOP contains series of frames that begin with I (intra) frame, followed by a number of P (predicted) frames or B (bi-directional predicted) frames. In practice, each GOP is considered as a video streaming task with an individual deadline. Deadline violation of any task reduces QoE (Quality of Experience) of the viewer.

With Cloud and Edge Computing gaining more popularity as the back end platform of many applications, the need for efficient use of these platforms is of paramount importance for individual users and businesses. A common practice for using cloud resources in many applications is to have a centralized queue of arriving tasks with a scheduler that allocates these tasks to a scalable pool of worker Virtual Machines (VMs). The tasks often have individual deadlines that failure to meet them compromises the Quality of Experience (QoE) expected by the end-users.

Although cloud providers supply virtually unlimited resources, users generally have budget constraints, thus, cannot lavishly acquire cloud resources (VMs). Such a resource limitation raises the oversubscription problem of the acquired resources, particularly, when there is a surge in the tasks arriving to the system. An oversubscribed system is defined as a system that is overwhelmed with arriving tasks to the extent that there is no way to meet the deadlines of all the tasks, thus, violating end-users' QoE.

A large body of research has been dedicated to alleviate the oversubscription problem. The approaches undertaken in these research works follow two main lines of thinking First, allocation-based approaches that try to minimize the impact of oversubscription through efficient mapping (scheduling) of the tasks to the resources. Second, approaches based on computational reuse that avoid or alleviates the oversubscription through efficient caching of the computational results. The latter is particularly effective when there is a redundancy in arriving tasks.

Although both of the aforementioned approaches are effective, they are limited in certain ways. The allocation-based approaches cannot entirely resolve the oversubscription because there is no such a solution according to the above-mentioned definition. In addition, many of the approaches are based on complex scheduling algorithms that impose extra overhead to the already oversubscribed system. The approaches based on computational reuse are also limited because they can only reuse the computations for tasks that are identical to the ones already completed and cached. In other words, if two tasks share part of their computation, it cannot be captured by current caching techniques.

Herein proposed is a mechanism based on computational reuse that aims at alleviating oversubscription by aggregating identical and similar tasks in the scheduling queue. Our mechanism is able to aggregate (i.e., merge) not only identical tasks, but also those that partially share their computation. Task aggregation is accomplished by the Admission Control component, upon task arrival. We would like to note that our mechanism complements the existing scheduling-based and caching-based approaches and is not a replacement for them. In particular, the merging mechanism makes the scheduling queue less busy and potentially lightens up the scheduling process. In addition, we know that caching systems do not cache the computational results of all tasks. The mechanism can improve computational reusability by capturing and merging tasks whose results are not cached.

Mergeable tasks are defined as those tasks that are either identical or sharing part of their operation with other tasks. A mechanism is needed to, first, detect different types of mergeable tasks and, second, eliminate the detected mergeable tasks from the scheduling queue without causing further deadline violations in the system. However, merging tasks can potentially increase the execution time of the merged task and cause missing the deadline of other tasks. More specifically, merging tasks raises two main problems that we address in this research: (A) What are different types of mergeable tasks and how to detect them? and (B) How to perform task aggregation without causing further deadline violations in the system?

The motivational case study in this research is a video streaming engine that needs to process videos (e.g., downsizing resolution or bit-rate) in the cloud before streaming them to viewers. In this system, it is likely that viewers request same videos to be streamed, hence, creating similar tasks in the system especially when the system is oversubscribed. For example, two viewers who use similar display devices may request to stream the same video with the same or different specifications. Alternatively, two viewers with dissimilar display devices may stream the same video but with different specifications (e.g., different spatial resolutions). The former example creates identical tasks in the system whereas the latter one creates similar tasks. Our proposed mechanism can detect identical and similar tasks and reuse the whole or part of computation by aggregating them. The advantage of task aggregation can be twofold: (A) Resources are utilized more efficiently and the cost of using cloud resources is reduced; (B) More tasks can meet their deadlines. Therefore, both viewers and stream providers can be benefited from the proposed mechanism.

In this system, an Admission Control component is developed that is able to detect different levels of similarity between tasks. The system is aware of the tasks' deadlines and performs merging without introducing additional deadline violations. The task aggregation also results in efficient utilization of resources and enables more tasks to meet their deadlines. Therefore, both viewers and system providers can be benefited from the proposed mechanism. In summary, the key contributions of this system are as follows: (A) Proposing an efficient way of identifying potentially mergeable tasks; (B) Determining appropriateness and potential side-effects of merging tasks; (C) Analyzing the performance of the task aggregation mechanism on the viewers' QoE and time of deploying cloud resources (VMs).

DETAILED DESCRIPTION OF THE INVENTION

Disclosed herein is a system for cloud computing services that can reuse the computation of identical or similar tasks. The system has the ability to detect similar tasks and aggregate them while they are pending for execution in the system. The system can benefit both cloud service providers and users. For cloud providers, the system saves the computational power and increase the throughput. In addition, it helps to reduce the oversubscription of the cloud servers, therefore, they are able to provide the same Quality of Service (QoS) with less resources. For cloud users, the system can improve utilization of cloud services, hence, achieve more cost-efficiency while providing the same QoS. The method has been developed in the context of video streaming using cloud services, but has applicability to a wide range of industries.

The developed system aggregates based on task similarity in three levels: Task-level similarity, Operation-level similarity, and Data-level similarity. The system contains 3 main components: Task Similarity Detector, Merge Appropriateness Identifier, and Task Merger. Task similarity detector maintains hash tables to quickly detect task similarity of a new task. Merge Impact Evaluator evaluates whether the merging is appropriate, in a sense that it does not cause additional deadline misses. Merge Impact Evaluator also contain a sub-component named Position Finder that, when applicable, selects the appropriate position for the merged task in the scheduling queue so that the aggregation does not impact QoS of other tasks in the system.

While storing multiple versions of the same video to serve different types of display devices is a conventional practice, Cloud-based Video Streaming Engine (CVSE) enables on-demand (i.e., lazy) processing of video streams, particularly for rarely accessed video streams. This is particularly useful for videos that rarely accessed. In fact, it has been proven that video streams have long-tail access pattern where most of video streams are rarely accessed and only a few percentage of videos are popular (hot). For instance, in the case of YouTube, it has been reported that only 5% of videos are frequently accessed and the rest are rarely accessed.

Figure 1:
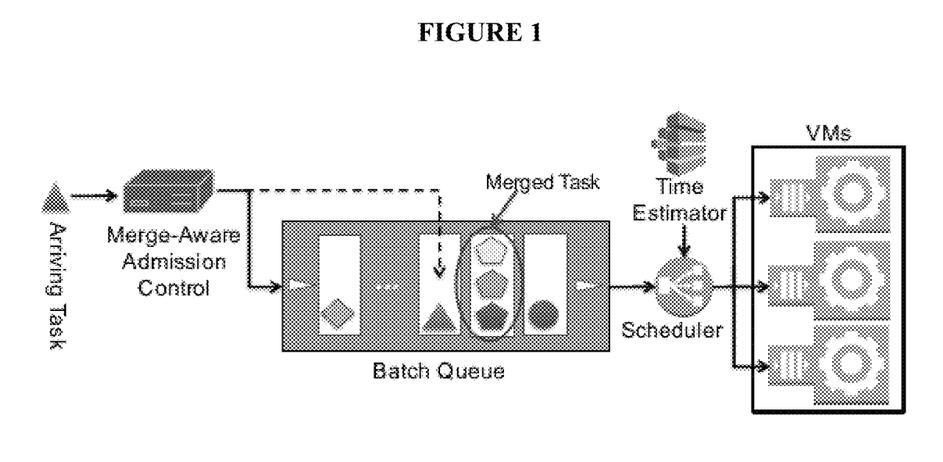
FIG. 1 provides a chart of merge-aware admission control for the Cloud-Based Video Streaming Engine (CVSE) System.

In the CVSE architecture, each task is a GOP (Group of Picture) of the requested video stream. A GOP task request (hereinafter "task") includes the operation required along with the corresponding parameters bound to the request. The Admission Control component, as shown in FIG. 1, sends the task to the batch queue (aka scheduling queue) where the task waits to be assigned by the scheduling policy to one of multiple VMs' queues. Most of the scheduling policies are reliant on the Time Estimator component that is aware of the expected execution time of each task type (e.g., different transcoding operations) on the cloud VMs. Tasks get executed on the assigned VM and streamed to the viewer.

Once a task is on a local VM queue, its data is fetched to that VM and finally the task gets executed (transcoded). Video Merger component is in charge of merging transcoded GOPs and transfer them to the viewer. Video Merger considers an output window for each video stream to keep track of processed GOPs. The GOPs that are missing (e.g., because of a failure) are requested to be resubmitted by the Admission Control component. GOPs of the videos that are getting popular are recognized by the Caching component of CVSE and are stored to enable caching-based computational reuse.

Admission Control is the front gate of accepting tasks to scheduling queue. We extend Admission Control with task aggregation mechanism. Upon arrival of a task to the system, task aggregation mechanism is in charge of identifying if the arriving task can be merged with any of the tasks already exist in the scheduling queue without violating deadline of other tasks. The proposed task aggregation mechanism, shown in FIG. 5, consists of three main components as follow: (A) Task similarity detector; (B) Merging appropriateness identifier; and (C) Task merger.

Figure 5:
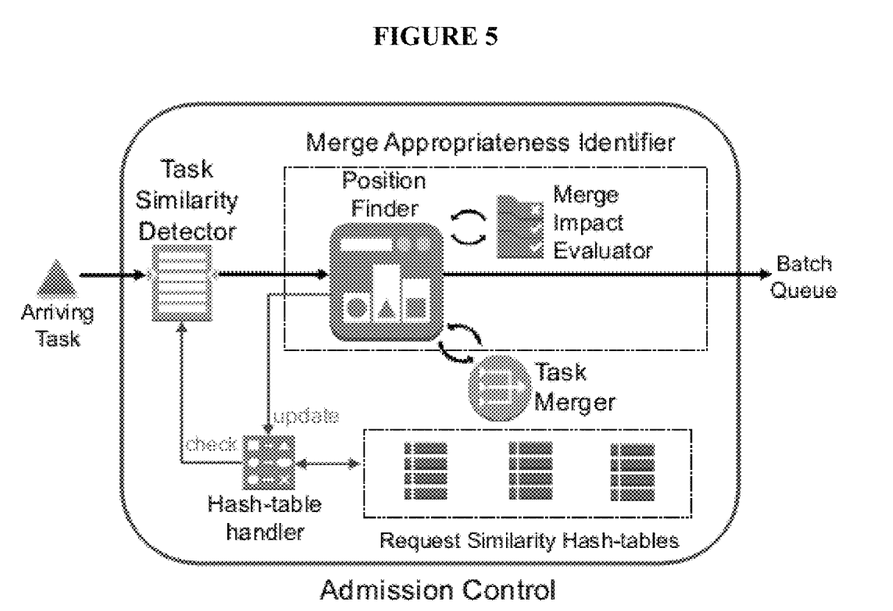
FIG. 5 provides the task aggregation mechanism inside the admission control of the CVSE.
Figure 6A:
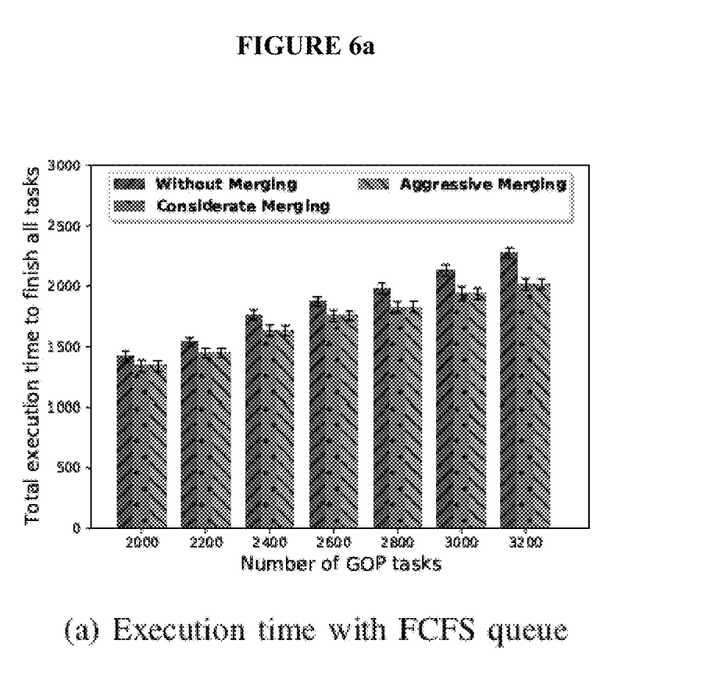
FIG. 6a shows the makespan under FCFS Queue.
Figure 6B:
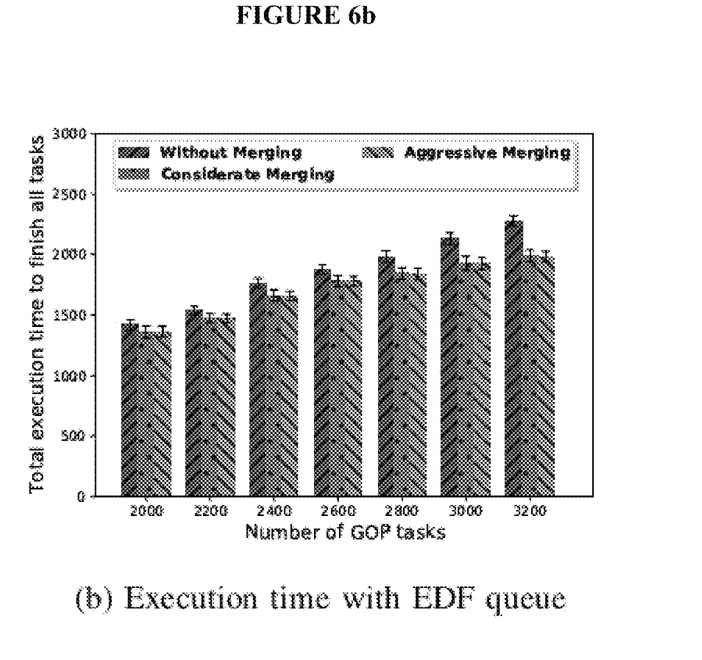
FIG. 6b shows the makespan under EDF Queue.
Figure 6C:
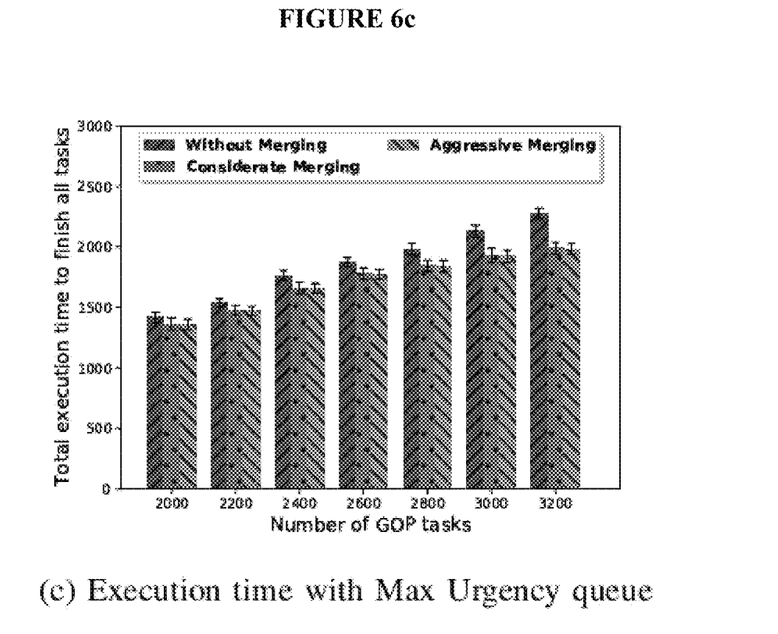
FIG. 6c shows the makespan under EDF Queue.
Figure 7A:
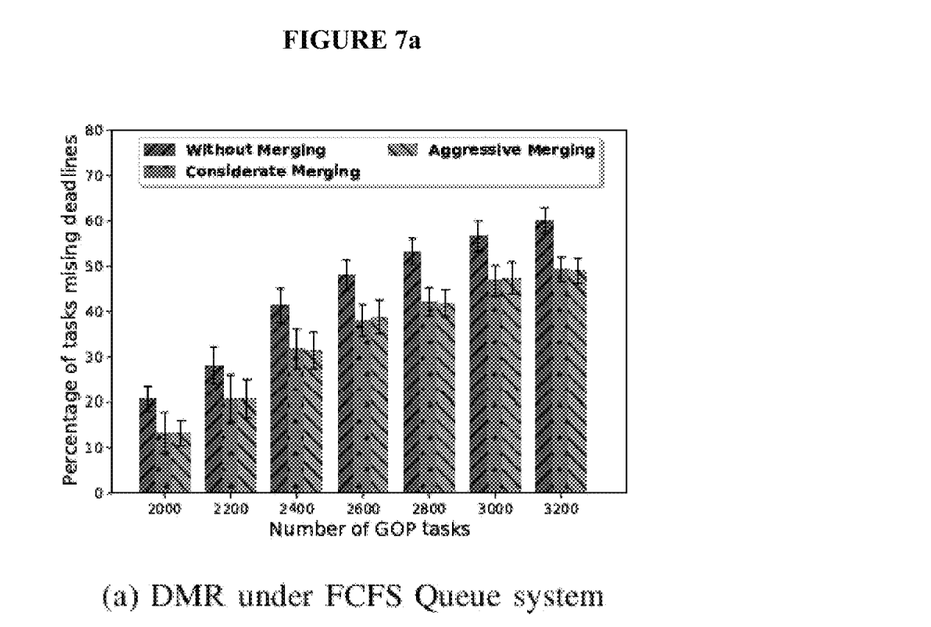
FIG. 7a shows the DMR under FCFS Queue.
Figure 7B:
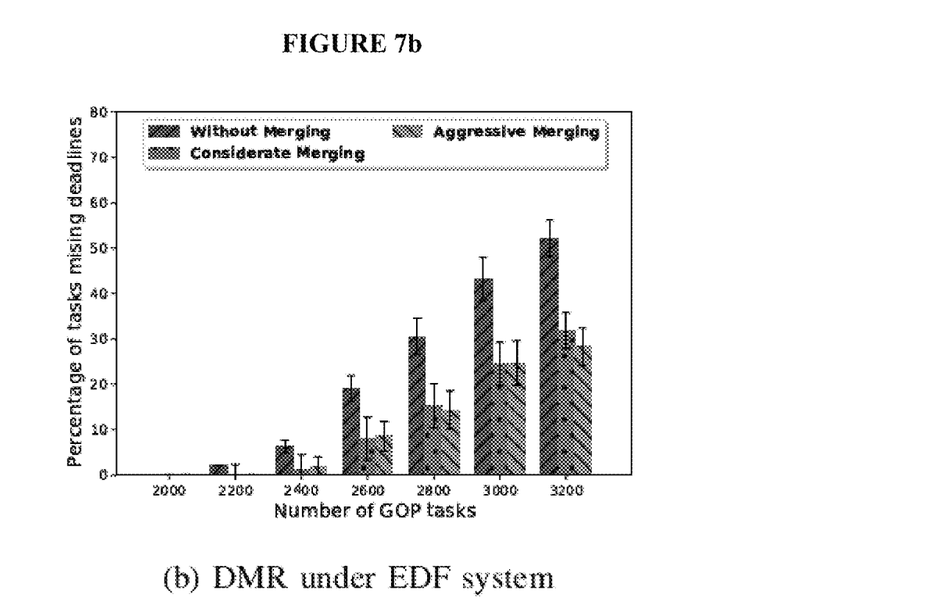
FIG. 7b shows the DMR under EDF Queue.
Figure 7C:
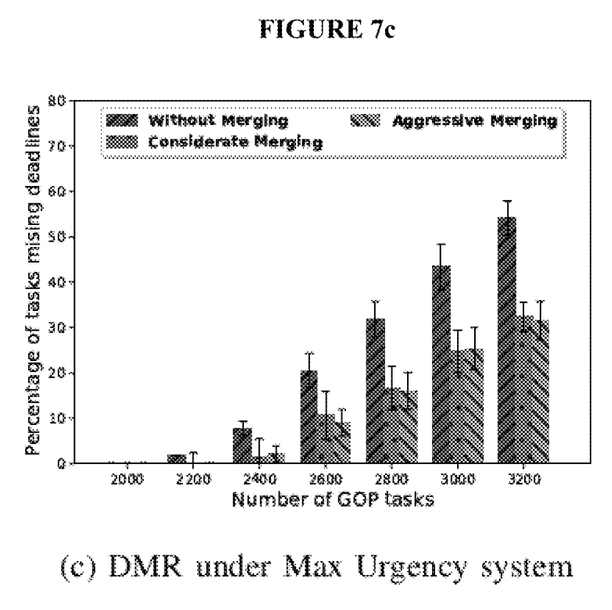
FIG. 7c shows the DMR under Max Urgency system.

Task Similarity Detector identifies mergeable tasks using hashing technique to seek for potentially mergeable tasks without stressing the already busy scheduler. Essentially, we maintain multiple hash tables to cover multiple levels of tasks' mergeability. If the arriving task is identified mergeable with an existing task, then the system utilizes Merge appropriateness identifier to assess if performing the merge on the identified tasks can impact other tasks in the system. Merge appropriateness identifier have two cooperating subcomponents. Position Finder locates the suitable position for merged tasks in the scheduling queue so that the other tasks still meet their deadlines. For a given position, Position finder consults with Merge Impact Evaluator to estimate which and how many tasks can potentially miss their deadlines as the result of merging. Once the merging is confirmed to be appropriate in a certain position in the scheduling queue, Task merger carry out the merge operation on the two tasks.

Although the idea of task aggregation is general and can be developed in many HPC systems, we note that the implementation details of the merge operation and the system support for merging are application-specific. In this work, we discuss task aggregation in the specific context of Video On Demand (VOD) streaming and CVSE. In particular, integrating Task aggregation within Admission Control of CVSE requires support from Time Estimator and Video Merger components. It also implies modification to task request structure and the GOP Scheduler to understand the new task request structure.

Mergeability of two given tasks can be explained based on the amount of computation the two tasks share. In particular, mergeability of two or more tasks can be achieved in the following levels: (A) Task-level: This is when more than one instance of the same task exists in the scheduling queue. Therefore, this level is also known as Identical tasks and can achieve maximum computational reusability. As these tasks are identical, merging them consumes the same resources required for only one task, hence, reducing both cost and processing delay; (B) Operation-level: This is when two or more tasks perform the same operation on the same data but with different configurations. In this level of merging, the two tasks can share part of their processing; and (C) Data-level: This is when two or more tasks perform different operations on the same data. This level of merging achieves the minimum reusability by saving only the time and processing overhead of loading data. The aforementioned reusability levels are generic and can be further categorized depending on the context.

It is noteworthy that, in operation and data levels, although merging increases the execution time of the merged task, it is still less than executing unmerged tasks individually. We should also note that the aforementioned reusability levels are generic and can be further categorized depending on the context.

The Admission Control component of CVSE is equipped with the task merging mechanism. Therefore, it can achieve task-level reusability for the same GOPs that need to be transcoded with the same configuration, but for different viewers. The Admission Control can achieve operation-level reusability for GOPs that perform the same transcoding with different configurations. Finally, it can achieve data-level reusability for the same GOPs that are transcoded differently.

Detecting Similar Tasks. Also disclosed is a method to detect similar tasks. It is theoretically possible to carry out task merging in the scheduling queue, i.e., after the task admission. In this case, to find mergeable tasks, we need to scan the entire queue and perform a pair-wise matching between the queued tasks. Practically, this approach is not efficient, because each time the queue is scanned, it imposes a significant number of redundant comparisons. Hence, we choose to perform task merging upon task arrival using the Admission Control component of the system.

Assuming there are n tasks in the queue, for each arriving task, a native mergeable task detection method has the overhead of performing n comparisons to find the mergeable tasks. To reduce the overhead, we propose a method that functions based on the hashing techniques. The general idea of the proposed method is to generate a hash key from the arriving task request signature (e.g., GOP id, processing type, and their parameters). Then, the Admission Control finds mergeable tasks by searching for a matching key in the hash table of tasks exist in the scheduling queue.

The explained method can detect task-level mergeability. It needs to be expanded to detect operation- and data-level of task mergeabilities. To maximize the computational reusability, an arriving task is first verified against task-level mergeability. If there is no match in the task-level, then the method proceeds with checking the next levels of mergeability, namely operation-level and data-level, respectively. To achieve the multiple levels of mergeability, we create three hash-tables—each covers one level of merge-ability. The hash-keys in each level are constructed from the tasks' characteristics that are relevant in deciding mergeability at that level. For instance, in video streaming case study, keys in the hash-table that verifies task-level mergeability are constructed from GOP id, processing type, and their parameters. While, keys in the hash-table that verifies operation-level mergeability are constructed from GOP id and processing type. Similarly, keys in the hash-table of data-level mergeability are constructed from GOP id.

Each entry of the hash-tables includes a hash-key and a pointer to the corresponding task. Entries of the three hash-tables must be updated upon a task arrival and execution. The only exception is Task-level merging, which does not require updating the hash-tables.

The following provides the procedure to update hash tables upon arrival or completion of tasks:

---

Upon arrival of task j:
(1) if j merges with existing task i on Task-level similarity:
    No update on hash-table is required
(2) if j merges with existing task i on Operation- or Data-level similarity:
    Add an entry to each hash-table with hash-keys of task
    j and point them to merged task i + j
(3) if j matches with existing task i but the system chooses not to merge them:
    Add an entry to each hash-table with hash-keys of task j and point them to task j
(4) if j does not match with any of the existing tasks:
    Hash-keys of task j are added to the respective hash-tables
Upon task j completing execution (i.e., dequeuing task j):
    Remove all entries pointing to task j from hash-tables

---

When the system merges task j with existing task i, the merged task, denoted as i+j, is essentially the object of task i that is augmented with request information (e.g., processing parameters) of task j. In this case, as shown in Step (2) of this procedure, the system only adds an entry to each hash-table with hash-key of task j pointing to merged task i+j as existing key for task i already pointed to task i+j. When task j is mergeable with existing task i, but the system decides to add task j to the batch queue without merging. In this case, task j has a higher likelihood of merging with other arriving tasks. The reason is that task i has not merged with task j and it does not merge with other arriving tasks. Hence, as shown in Step (3) of the procedure, the matching entry pointing to task i is redirected and points to task j. It is worth noting that if the arriving task does not match with any of the existing tasks, as shown in Step (4), its hash-keys must be generated and added to the respective hash-tables. Also, when a task completes its execution, its corresponding entries are removed from the hash-tables.

Identifying Merging Appropriateness. Assume an arriving task j has Operation- or Data-level similarity with existing task i. Also, assume that task i is scheduled ahead of at least one other task, denoted task k, in the scheduling queue. Merging task j with i either delays the execution of task k or task i. Such an imposed delay can potentially cause task k or i to miss their deadlines. Therefore, it is critical to assess the impact of merging tasks before performing the merge. The merge is carried out only if it does not cause deadline violation for other tasks. It is noteworthy that Task-level merging does not delay the execution of other tasks, thus, always can be performed.

Figure 4:
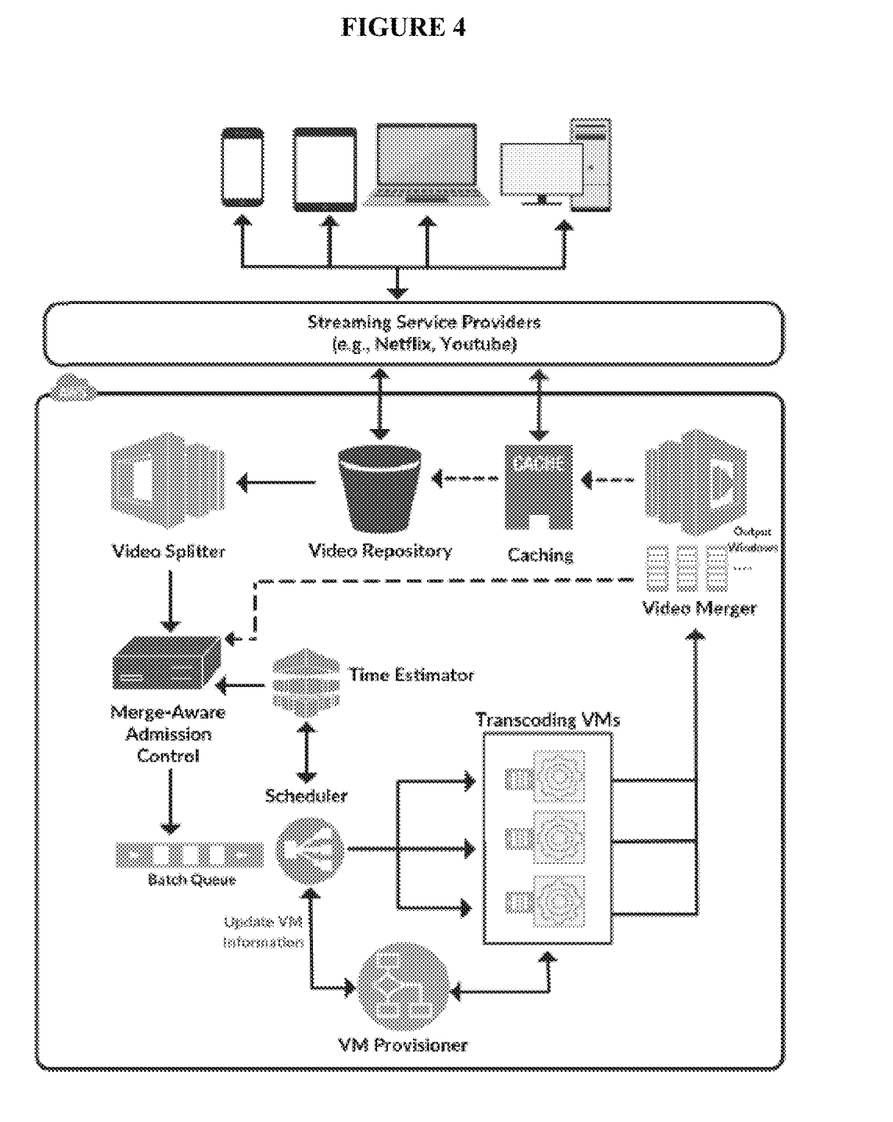
FIG. 4 provides an overview of the CVSE that is used for on-demand processing of video streams.

Accordingly, in this section, we first introduce Merging Impact Evaluator component whose job is to assess the impact of the merging arriving task on existing tasks. Later, we introduce Position Finder, whose job is to position the arriving task in the scheduling queue, either through merging with other tasks or as a new entry in the scheduling queue. The goal is to perform task aggregation without causing deadline violation for other tasks. Accordingly, the impact of merging two or more tasks is evaluated based on the number of tasks missing their deadlines due to the merging. The evaluation requires Time Estimator component (see FIG. 4) to estimate the execution time of any given task.

Impact of merging can be assessed based on additional deadline misses of tasks following merged tasks when merging occurred against without. Impact of merging assessor creates virtual copies of scheduling queue in two scenarios: with merging occurred and without. It simulates the scheduling and estimates completion time of each task, then compares to its deadline. Merging is only carried out if it does not cause additional deadline violations than it would normally happen if the tasks are not merged.

To evaluate the impact of merging, a temporary structure, called virtual queue, is constructed that contains a copy of machine queues. Then, we assume the merging has taken place on the tasks in the batch queue and schedule tasks to the virtual queue according to the system's scheduling policy. We estimate the number of tasks missing their deadlines in the presence of merging.

We consider the worst-case analysis to calculate completion time of each task and estimate if a task misses its deadline. In our CVSE implementation where Time Estimator component estimates execution time in form of mean and standard deviation, for a given task i, let $\mu_i$ and $\sigma_i$ denote the mean and standard deviation of its execution time. We define the worst-case estimated execution time of task i as $E_i = \mu_i + 2\sigma_i$.

The estimated completion time of task i on a given machine m, denoted as $C_i^m$ and formally shown in Equation 1, is calculated as the sum of the four following factors: (A) current time, denoted $\tau$; (B) estimated remaining time to complete the currently executing task on machine m, denoted $e_r^m$; (C) sum of the estimated execution times of N tasks pending in machine queue m, ahead of task i. This is calculated as $\Sigma_{p=1}^{N}=(\mu_p+2\sigma_p)$ (D) estimated execution time of task i.

$$C_i^m = \tau + e_r^m + \sum_{p=1}^{N}(\mu_p + 2\sigma_p) + (\mu_i + 2\sigma_i) \quad (1)$$

It is possible that Merge Impact Evaluator realizes that the number of tasks missing their deadlines with and without merging are equal. In this tie situation, intuitively, we prefer to perform merging to save the overall computation time. However, when the estimated number of tasks missing their deadlines are more than zero, one may argue an alternative approach to not perform task aggregation. Such decision can be because: (1) merging tasks delay completion time of tasks waiting in the batch queue. In extreme cases, depending on the scheduling policy, this can potentially result in starvation; or (2) we use a worst-case analysis to estimate tasks missing their deadlines. Therefore, if the analysis suggests that a task misses its deadline, it does not necessarily mean the task will inevitably miss its deadline. Merging ahead of those tasks, however, increases their chance of missing their deadlines.

Once two tasks are detected as mergeable, the next question is: where should the merged task be placed in the batch queue? The number of possible answers depends on the scheduling policy of the system. Position Finder examines possible locations in the queue and for each one it consults with the Merge Impact Evaluator component to identify if the merge has potential side-effects on the involved tasks. Once Position Finder locates an appropriate position, it uses Task Merger component to construct the merged task.

Generally, scheduling policies sort the scheduling queue based on a certain metric (or the "queuing policy"). For instance, Earliest Deadline First assumes the queue to be sorted based on tasks' deadlines. This assumption restricts the number of positions can be found for the merged tasks and can potentially limit the performance gain of task aggregation. We respect the queue ordering enforced by the scheduling policy. However, to maximize the performance gain of task aggregation, we are also interested to consider the scenario in which the ordering of the tasks in the queue can be relaxed in favor of task aggregation. Therefore, to conduct a comprehensive study, in this section, we investigate two main scenarios: (A) when the queuing policy is maintained; or (B) when the queuing policy is relaxed.

In fact, scheduling policies in homogeneous systems (e.g., Shortest Job First (SJF) and Earliest Deadline First (EDF)) order tasks in the batch queue whereas scheduling policies of heterogeneous systems (e.g., Minimum Completion-Minimum Completion (MinMin) and Min Completion-Maximum Urgency) do not care the order of tasks in the batch queue. For Scheduling policy that do not care about task positioning in the queue, the Position finder in any arbitrary place.

Conversely, queue that does not strictly impose any sorting criteria based on task's property are called Unsorted batch queue. Unsorted batch queue allow tasks to be placed in any order, thus algorithm with choice elimination is required so the system does not have to use brute force trying every position.

Appropriate Task Positioning while Queuing Policy is Maintained: If we choose to maintain the queuing policy, then possible positions to place the merged task are limited. In this part, we study three commonly used queuing policies: (A) First Come First Serve (FCFS); (B) Earliest Deadline First (EDF); and (C) Max Urgency. While FCFS and SJF are well-known queuing policies, Max Urgency sorts the tasks in the queue based on based on tasks' deadline and execution time. More specifically, for task i, urgency is calculated as $U_i=1/(\delta_i-E_i)$, where $U_i$ is urgency score of task i, $\delta_i$ is deadline of task i and $E_i$ is estimated execution time of task i.

FCFS: Let j the arriving task and i a matching task already exists in the queue. In this case, the arrival time of the merged task i+j, can be either the arrival time of task i or task j. Accordingly, i+j can be positioned either in task i or j spot. In the former case, i+j delays completion time of tasks located behind i. In the latter case, i+j only delays completion time of i. In either case, the delayed task(s) can potentially miss their deadline due to the merge operation. A compromise between these two extreme positions is possible.

EDF: In this policy, tasks with earlier deadline are positioned earlier in the queue. When two or more tasks are merged, each of them still keeps its individual deadline. However, only the earliest deadline is considered for the queuing policy. Assuming that existing task i has earlier deadline than arriving task j, task i+j can only be positioned only in task i's spot.

Max Urgency: Recall that except for Task-level merging, other levels of merging increases the execution time of the merged task. In this case, the urgency of i+j is: $U_{i+j}=1/(\min(\delta_i, \delta_j)-E_{i+j})$. This means, the urgency of the merged task is increased, thus, the merged task can potentially move forward in the queue and gets executed earlier. This can potentially cause missing the deadline of tasks located ahead of i in the scheduling queue.

Appropriate Task Positioning while Queuing Policy is Relaxed: Queuing policies mentioned in the previous part are not aware of task aggregation. Except Max Urgency that moves the merged task forward in the queue, due to increase in the merged task urgency, other policies do not relocate the merged task. However, a suitable position for the merged task could be found by relaxing the queuing policy. In this case, assuming there are n tasks in the batch queue, the merged task, has to be examined against n possible locations to find the position that maximizes the chance of all tasks meeting their deadlines. Examination of a possible location implies evaluating the impact of merging that needs running scheduling method. Assuming there are m machines in the system, each impacts evaluation costs n·m and performing that for all n possible locations implies $n^2 \cdot m$ complexity. We can consider the time complexity of finding an optimal solution as approximately $O(n^3)$.

Such overhead is itself a burden to a system that is already oversubscribed. Therefore, in the rest of this section, we propose two position finding heuristics and analyze them. The objectives of these heuristic are: (A) not to allow the merged task to miss its deadline; and (B) do not cause other tasks to such overhead is itself a burden to a system that is already oversubscribed. Therefore, in the rest of this section, we propose two position finding heuristics and analyze them. The objectives of these heuristic are: (A) not to allow the merged task to miss its deadline; and (B) do not cause other tasks to Logarithmic Probing Heuristic: The procedure evaluates the impact of merging when i+j is in the middle of the queue. The evaluation result dictates how to proceed with the probe as follows: (A) The position neither causes deadline violation for other tasks nor for i+j. Therefore, the appropriate position is found; (B) Task i+j misses its deadline but the number of other tasks missing their deadlines does not increase as a result of merging. This implies that i+j should be executed earlier. Thus, the procedure continues to probe in the first half of the queue; (C) Task i+j meets its deadline but the number of other tasks missing their deadlines increases as a result of merging. This implies that i+j should be executed later to reduce merging impact to other tasks. Thus, the procedure continues to probe in the latter half of the queue; and (D) Task i+j misses its deadline and the number of other tasks missing their deadlines increases as a result of merging. Then, stop the procedure and cancel merging, because the procedure cannot find an appropriate position for merging. The aforementioned steps are repeated until it terminates or there is no position left to be examined in the batch queue. In the latter case, we stop the procedure and cancel merging.

Linear Probing Heuristic: We know that the order of tasks in the batch queue implies the order of their execution. That is, placing a task in position p of the queue only delays tasks located behind p. That said, the first phase of this heuristic aims at finding the latest position for task i+j in the batch queue so that it does not miss its deadline. The latest position for i+j in the queue implies the minimum number of tasks are affected—those located behind the merged task.

To carry out the first phase, the procedure constructs virtual queues to find the latest position for i+j. For that purpose, it alternates the position of i+j in the batch queue, starting from the head of the queue. In each position, the completion time of i+j is calculated based on the tasks located ahead of it and is examined if i+j misses its deadline. Once task i+j misses its deadline, the previous position is the latest possible location for it not to miss its deadline. Once we find the latest position for i+j, we need to verify if the insertion of i+j causes any deadline violation for the tasks behind it or not. For that purpose, in the second phase, we only need to invoke the Merging Impact Evaluator once. If there is no impact, then the found position is confirmed otherwise the merging is canceled. It is noteworthy that this procedure is efficient because virtual queue is created only once. Plus, after each task assignment to the virtual queue, it simply adds one more checking to calculate i+j completion time.

Analysis of the Heuristics: In this part, we analyze Logarithmic Probing and Linear Probing heuristics in terms of their complexity of the position they find. Phase one of Linear Probing Heuristic requires n tasks to be scheduled on m machines and also additional check if i+j can be schedule on any of m machines if it placed directly after each task's position, that results in n·m complexity to provide a single position for Phase two to verify. Phase two is essentially evaluating the impact of merging which again needs n tasks to be scheduled on m machines. The combined complexity of the two phases is 2·n·m. Alternatively, Logarithmic Probing Heuristic spends trivial computation of $O(1)$ to choose a position in the batch queue and verify the appropriateness of the position. If the position identified inappropriate, the search continues for up to log n positions. Since the complexity of evaluating each position is n·m, the total complexity is n·m·log n. As the complexity of evaluating impact of merging dominates the total complexity, the Linear Probing Heuristic that evaluates the impact for only one position is more efficient.

Optimality Analysis. Assume that there are multiple appropriate positions for task i+j. Logarithmic Probing Heuristic returns the first position it finds and meets the criteria, thus, is not biased to any certain appropriate position for the merged task. Alternatively, Linear Probing Heuristic always finds the latest appropriate position in the batch queue for task i+j. This ensures that task i+j has the least impact on other tasks' completion times. Being the latest possible position, however, increases the likelihood for i+j to miss its deadline. In addition, this makes it unlikely for other tasks to be allocated in front of i+j, i.e., limiting the chance of future merging. If this is an issue, it is possible to test second latest position or third latest position first before testing the latest possible position, at cost of additional computation.

Assuming we have n tasks in the batch queue. For finding a single position to test: logarithmic probing requires negligible time to give which positions to test while Linear probing requires up to n tasks scheduling before it gives a position. However Logarithmic probing produces up to log n position to test for the criteria of not missing task i+j's deadline and do not cause additional deadline misses compare to not merging, while linear probing only gives one position to test against the criteria.

Each run of merge impact evaluation requires scheduling of n tasks. With one position to test, the total cost of scheduling with linear probing requires at most 2·n tasks scheduling (n to find a candidate position for task i+j and another n to verify the queue against our criteria of not causing additional deadlines). The logarithmic probing, however, provides up to log n positions to test which then requires up to n log n tasks scheduling to find a suitable position that meets the criteria.

Since scheduling part of the Impact of Merging Evaluation dominates the position finding overhead, linear probing is arguably a better solution. The decision could be change in the future if the overhead of Impact of Merging Evaluation is significantly reduced by optimizing and reusing parts of the estimation for similar queues.

Performance Evaluation. A prototype of the CVSE is provided with task aggregation mechanism equipped. It is designed to operate in different modes, namely real streaming mode and emulation mode that is used for testing purposes. In this study, to examine various workloads, we used CVSE in the emulation mode. We evaluated the proposed mechanism using eight homogeneous VMs modeled after Amazon GPU (g2.2xlarge) VM.

The video repository we used for evaluation includes multiple replicas of a set of benchmark videos. Videos in the benchmarking set are diverse both in terms of the content types and length. The length of the videos in the benchmark varies in the range of [10, 600] seconds splitting into 10-110 Group Of Picture (GOP) segments. For each GOP of the benchmark videos, we obtained their processing times by executing each processing operation 30 times on Amazon GPU VM. The processing operations we benchmarked are: reducing resolution, changing codec, adjusting bit rate, and changing frame rate.

To evaluate the system under various workload intensities, we generate [2000, 3000] GOP processing tasks within a fixed time interval. We collect the deadline miss-rate (DMR) and makespan (i.e., execution time to finish all tasks) of completing all tasks. We conducted each experiment 30 times, each time with random task arrival time and order. Mean and 95% confidence interval of the results are reported. We examined three queuing policies, namely FCFS (First-Come-First-Serve), EDF (Earliest Deadline First), and MU (Max Urgency). For each queuing policy, we studied no task merging versus task merging. In the experiments, all tasks must be completed, even if they miss their deadline.

Figure 2:
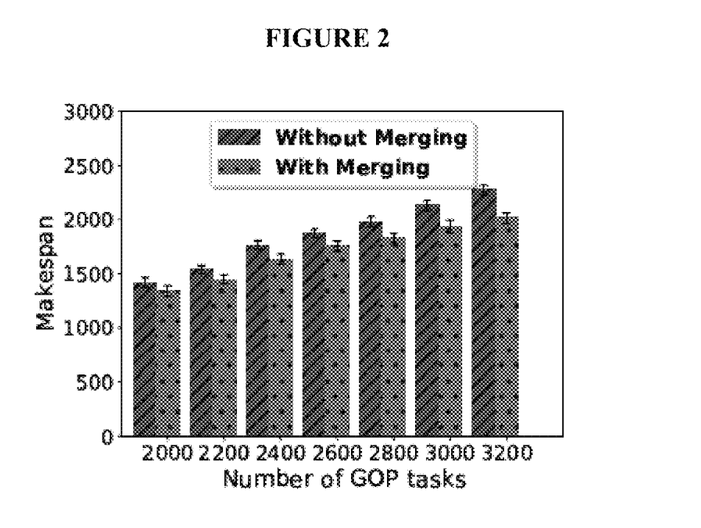
FIG. 2 provides a graph of comparison of the total time to complete tasks (i.e., makespan) under varying number of arriving GOP tasks (horizontal axes) in two scenarios: without task merging and with task merging.

Evaluating Makespan: In the first experiment, the goal is to see the impact of task merging on makespan. In fact, makespan implies the time cloud resources are deployed, which implies the cost incurred to execute all the tasks. We examine the system under various subscription levels (from 2000 to 3200 GOPs) arriving within the same time interval. As seen in FIG. 2, our proposed merging mechanism saves between 4.40% and 14.33% in makespan. Execution time saving is more pronounced when the system is more oversubscribed. It is worth noting that makespan does not vary under different scheduling policies.

Figure 3A:
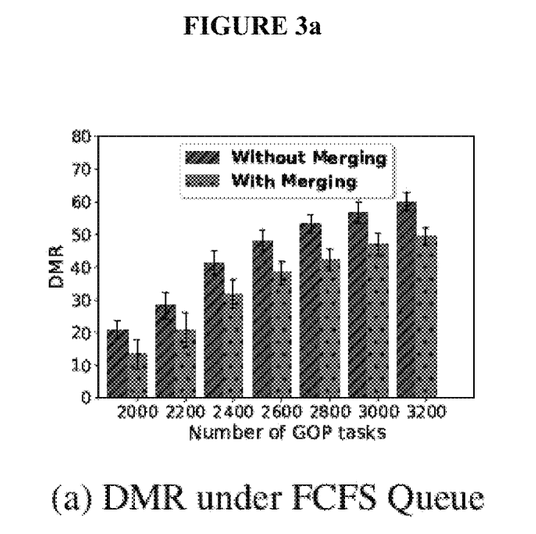
FIG. 3a shows the DMR under FCFS Queue.
Figure 3B:
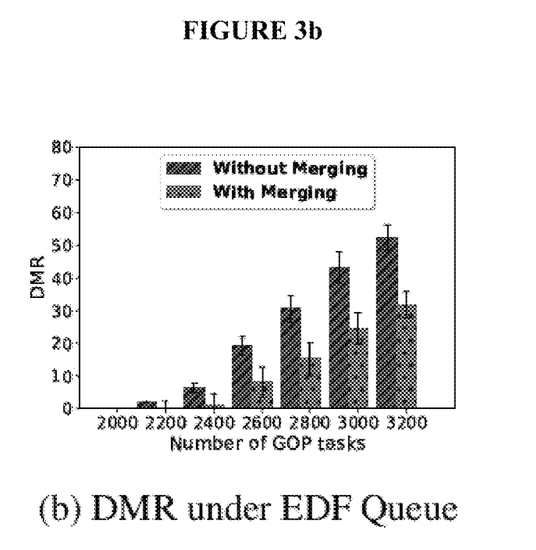
FIG. 3b shows the DMR under EDF Queue.
Figure 3C:
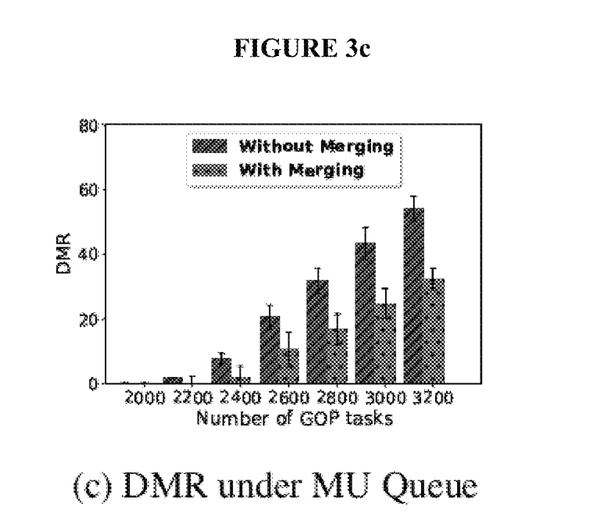
FIG. 3c shows the DMR under MU Queue.

Evaluating Deadline Miss Rate (DMR): In this experiment, the goal is to evaluate viewers' QoE. For that purpose, we measure the deadline miss rate resulted from no merging versus merging tasks under various oversubscribed levels and with different scheduling policies. As shown in FIG. 3, we observe that task aggregation significantly reduces deadline miss rate in all scheduling policies. We can see that the improvement in deadline miss rate of FCFS is less than EDF and MU scheduling policies. This is because FCFS by nature causes a larger average waiting time and does not schedule tasks by considering their deadline. Therefore, task merging mechanism performance, when combined with FCFS, is lower than other scheduling polices.

Comparing the results shown in FIG. 2 with those in FIG. 3 reveals that the difference in deadline miss rate is more dramatic than the makespan time. This is due to the fact that even small reduction in task completion time can cause the merged tasks meet their deadlines instead of missing that. We can conclude that the impact of task aggregation mechanism on viewers' QoE can become more remarkable when it is combined with efficient scheduling policies. For example, at 2200 GOP requests per time interval that the system is just starting to get oversubscribed. Task merging bring deadline miss-rate of EDF queue system from 2.17% down to 0.15%. This is due to the fact that even small reduction in task completion time could be enough to make the difference between finishing task before deadline or missing the deadline entirely.

Another note is that the deadline miss-rate (DMR) of system with FCFS queuing policy is higher than with other two policies. This is because, despite our help of policy-relaxed position finder which finds good positions in the queue for merged tasks which eliminates deadline misses for merged tasks, majority of tasks with short deadlines in the queue are not merged and they are bound to miss their deadlines going through FCFS queue. This proves that task aggregating mechanism is effective in approaching our goal of reducing total execution time (and cost associate with it) and also reducing the number of tasks missing their deadlines and thus improving viewer's QoE.

Merging Aggressiveness: We speculated that aggressive merging should be more effective than considerate merging in reducing total execution time but worse in reducing DMR due to some inappropriate merging which incur task missing its deadline as the result of merging. According to FIG. 6, aggressive merging only marginally outperform considerate merging when the system get oversubscribed. However, FIG. 7 suggests that it also outperform considerate merging in reducing DMR in severely oversubscribed condition.

We noticed that merging inappropriately (i.e., merge operations that cause additional deadline violations) are not very common in our test cases, thus only a minor difference can be observed in execution time. But despite the minor change in total execution time, those differences still result in a lower cumulative start time and completion time of tasks in the long run. Hence a more noticeable drop in DMR can be observed. Specifically, when the system gets severely oversubscribed, aggressive merging causes some deadline misses by inappropriate merging, however, improves the overall situation when it is compared with considerate merging.

From this observation, we conclude that an efficient merging strategy uses considerate merging by default, to avoid any misses caused by inappropriate merging. However, as the system gets more oversubscribed, a more aggressive merging consideration should be used instead.

The subject matter of the present invention is described with specificity herein to meet statutory requirements. However, the description itself is not intended to necessarily limit the scope of claims. Rather, the claimed subject matter might be embodied in other ways to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Furthermore, the described features, structures, or characteristics may be combined in any suitable manner in one or more embodiments. Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment.

Moreover, the terms "substantially" or "approximately" as used herein may be applied to modify any quantitative representation that could permissibly vary without resulting in a change to the basic function to which it is related.

The invention claimed is:

1. A system for server-less cloud computing comprising:
   (a) a processor and a computer readable medium operably coupled thereto, the computer readable medium composing a plurality of instructions stored in association therewith that are accessible to, and executable by, the processor in an Admission Control Component, comprising:
      (i) a Task Similarity Detector;
      (ii) a Merge Appropriateness Identifier;
      (iii) a Task Merger;
      (iv) at least two tasks;
      (v) a hash-table handler; and
      (vi) at least one Request Similarity Hash-table;
   (b) a Time Estimator; and
   (c) a Scheduler;
   wherein each at least two tasks comprise a Group of Picture of a requested video stream;
   wherein the Task Similarity Detector comprises coding capable of maintaining one or more hash tables, wherein said hash tables comprise on or more entries, wherein each entry comprises a hash-key and a pointer to a corresponding task;
   wherein the Merge Appropriateness Identifier comprises coding capable of evaluating the impact of merging two or more tasks on any other tasks in a scheduling queue of the system;
   wherein the Merge Appropriateness Identifier comprises:
      a Merge Impact Evaluator,
         wherein said Merge Impact Evaluator further comprises a Time Estimator, and said Time Estimator estimates the completion time of a task i on a given machine m, denoted as Cr by use of the following equation:

$$C_i^m = \tau + e_r^m + \sum_{p=1}^{N}(\mu_p + 2\sigma_p) + (\mu_i + 2\sigma_i)$$

using the following factors:
   (a) current time, denoted $\tau$;
   (b) estimated remaining time to complete the currently executing task on machine m denoted $e_r^m$;
   (c) sum of the estimated execution times of N tasks pending in machine queue m, ahead of task I, calculated as $\sum_{p=1}^{N}(\mu_p + 2\sigma_p)$; and
   (d) estimated execution time of task i.

2. The system of claim 1, wherein the Merge Appropriateness Identifier comprises:
   a Position Finder.

3. The system of claim 1, wherein the mergeability of two tasks is achieved on a task level or an operational level.

4. A system for server-less cloud computing comprising:
   a processor and a computer readable medium operably coupled thereto, the computer readable medium composing a plurality of instructions stored in association therewith that are accessible to, and executable by, the processor:
   (a) a Task Similarity Detector;
   (b) a Merge Appropriateness Identifier;
   (c) a Task Merger; and
   (d) at least two tasks;
   wherein the Task Similarity Detector comprises coding capable of maintaining one or more hash tables, wherein said hash tables comprise on or more entries, wherein each entry comprises a hash-key and a pointer to a corresponding task;
   wherein the Merge Appropriateness Identifier comprises coding capable of evaluating the impact of merging two or more tasks on any other tasks in a scheduling queue of the system;
   wherein the Merge Appropriateness Identifier comprises:
   (a) a Position Finder; and
   (b) a Merge Impact Evaluator;
   wherein said Merge Impact Evaluator further comprises a Time Estimator, and said Time Estimator estimates the completion time of a task i on a given machine m, denoted as $C_i^m$ by use of the following equation:

$$C_i^m = \tau + e_r^m + \sum_{p=1}^{N}(\mu_p + 2\sigma_p) + (\mu_i + 2\sigma_i)$$

using the following factors:
   (a) current time, denoted $\tau$;
   (b) estimated remaining time to complete the currently executing task on machine m, denoted $e_r^m$;
   (c) sum of the estimated execution times of N tasks pending in machine queue m, ahead of task i, calculated as $\sum_{p=1}^{N}(\mu_p + 2\sigma_p)$; and
   (d) estimated execution time of task i.

5. The system of claim 1, wherein said system for server-less cloud computing is used as part of a video streaming service.

6. The system of claim 2, wherein the Position Finder comprises functionality to locate a suitable position for at least one merged task in the scheduling queue.

7. The system of claim 4, wherein said system for server-less cloud computing is used as part of a video streaming service.

8. The system of claim 4, wherein the Position Finder comprises functionality to locate a suitable position for at least one merged task in the scheduling queue.

9. The system of claim 4, wherein the mergeability of two tasks is achieved on a task level or an operational level.

* * * * *